United States Patent

[11] 3,582,113

| [72] | Inventor | Brian R. Cauthery |
| | | R. R. #1, Caledon, Ontario, Canada |
| [21] | Appl. No. | 802,802 |
| [22] | Filed | Feb. 27, 1969 |
| [45] | Patented | June 1, 1971 |

[54] PIPE JOINT
1 Claim, 4 Drawing Figs.

[52] U.S. Cl. ............................................. 285/110, 285/106, 285/345
[51] Int. Cl. ............................................. F16l 17/02
[50] Field of Search............................................ 285/110, 113, 106, 230, 231, 345, 350, 369, 383, (Dig. 18); 277/207 A

[56] References Cited
UNITED STATES PATENTS

| 2,245,153 | 6/1941 | McWane ................... | 285/110X |
| 2,457,908 | 1/1949 | Meyerhoefer ............. | 277/207A |
| 3,179,445 | 4/1965 | Moretti ..................... | 285/106 |
| 3,315,970 | 4/1967 | Holloway .................. | 285/345X |
| 3,414,297 | 12/1968 | Pollia ........................ | 285/110X |

FOREIGN PATENTS

| 1,026,710 | 3/1958 | Germany.................... | 285/345 |
| 432,953 | 9/1967 | Switzerland................ | 285/110 |
| 602,383 | 2/1960 | Italy ........................... | 285/O-ring |

Primary Examiner—Dave W. Arola
Attorney—George H. Riches

ABSTRACT: A rigid socket for coupling in sealed relation with a plastic pipe has an annular inner recess to receive a soft O-ring, the inner flank of the recess being relieved to provide controlled deformation of the soft O-ring on insertion of the plastic pipe therethrough, and to permit the access of pressure fluid against the tapered radially outer surface of the O-ring, to provide dynamic low stress sealing of the O-ring against the plastic pipe, and thus avoid creep failure of the pipe.

PATENTED JUN 1 1971 3,582,113

Inventor
Brian R. Cauthery
By
Attorney

PIPE JOINT

This invention is directed to a method of coupling pipes together in sealing relation, and to a pipe fitting arrangement.

In sealing pipes by spigot and socket connection, particularly plastic pipes in which service life is determined by the level of operating creep, many joint types have been developed using an annular sealing ring, such as an O-ring. However, these previous arrangements have been characterized by various drawbacks such as costly production techniques to thicken the plastic pipe end, inadequate sealing, the need to provide O-rings of particular formed cross section, or the generation of high shearing stress in the wall of the spigot pipe sufficient to cause flow of plastic wall material until failure occurs.

In the present invention there is utilized a sealing O-ring of circular cross section made of elastomeric material having a durometer value in the range of 20—50 Durometer, and preferably between 40 and 50 Durometer, mounted in the muff or socket portion of the combination so that insertion of a pipe spigot through the O-ring produces radial and axial deformation of the ring to provide an axially tapered ring surface exposed to system pressure such that a radially inward force component holds the deforming O-ring in sealing engagement with the pipe spigot, while an axially outward force component holds the O-ring in sealing relation with an inner annular shoulder portion of the fitting socket.

In order to provide the specific ring deformation required to produce the desired sealing forces, the annular ring-receiving recess in the socket is in the form of a semicircle, having the inner face thereof relieved in the direction of penetration of the socket to ensure the requisite ring axial deformation. The inner face is relieved by radiusing at substantially twice the radius of the recess cross section radius. To ensure access for pressurizing fluid against the deformed outer flank of the sealing O-ring the cross-sectional area of the recess is made some 10—15 percent greater than the cross-sectional area of the deformed O-ring in its compressed condition. The range of variation in the recess cross section is tied to the permissible limits of variation in the outer diameter (OD) of the inserted pipe spigot.

In addition to providing a simple spigot, muff and ring combination, the present invention provides particular advantages in providing a plastic coupling to receive a spigot made of plastic such as polyvinylchloride, Polyethylene, Acrylonitryle Butadiene Styrene, Polypropylene, etc. in a substantially rigid socket. Such a coupling combination is also of value in the utilization of metallic fixtures and fittings in combination with a plastic pipe system, particularly in view of the susceptibility to creep failure of these thermoplastics. By admitting system pressure to the pressure face of the O-ring, the seal effectiveness is enhanced, while the increased axial deformation of the O-ring due to the application of pressure fluid and the consequent increase in seal contact area of the ring with the plastic spigot pipe diminishes the shearing force, thus reducing the tendency to produce plastic flow and ultimate failure of the pipe wall.

The subject joint permits assembly and manual transportation of several lengths of coupled pipe, owing to the inherent self-protecting form of the muff or socket recess so that the O-ring does not become pinched or damaged when the pipes are transported in an unsupported sagging condition.

The form of O-ring recess provided in the muff particularly lends itself to casting techniques, and the avoidance of sharp edged reentrants in the groove or recess cross section avoids stress concentration zones such as occur in the provision of ring grooves of rectangular cross section.

In order to ensure continued pressure communication between the flow conducting portions of the pipes and the seal pressure face an appropriate rough finish may be provided to the stop shoulder of the socket, or the inner end wall of the pipe spigot may be suitably perforated or castellated.

A pipe joint seal comprising a first pipe having a substantially rigid muff portion at its end, a second pipe having one end telescopically entered in the muff portion of the first pipe, an arcuate annular recess in the inner wall of the muff portion adjacent its open end and located to surround said one end of the second pipe, said recess having a relieved surface adjacent to the inside edge of the recess to provide a pressure access annulus in direct communication with a pressure chamber formed between the inner and outer walls of the muff portion and the second pipe respectively, and solid, hydraulically compressible soft elastomeric sealing-ring of circular cross section, said ring when squeezed between the recess walls and the said one end of the second pipe being compressed and deformed to fill said recess with a portion protruding into said pressure chamber said portion forming one wall of the pressure access annulus whereby fluid under pressure acts to squeeze and compress the sealing ring against the recess surfaces and the outer periphery of the said one end to thereby seal the joint.

The practice of the invention is embodied in a fitting socket for use in sealed coupling relation with the pipe spigots, comprising; a substantially rigid muff portion having a generally cylindrical bore therein to receive the spigot or fitting, the bore having an axial outer portion, an axial inner portion, and an annular recess in the muff inner wall located between the bore portions to receive a resilient elastomeric sealing ring, the recess having an axial outer end wall adjacent the bore extending substantially normal to the bore to provide an annular sealing ring abutment, and an axially tapered wall portion connecting with the bore axial inner portion to provide a pressure access annulus connecting with the recess whereby in operation, with an elastomeric sealing ring in the recess and a pipe spigot inserted within the socket and extending through the ring in sealing and axially inward deforming contact with the ring, the admission of pressurizing fluid to the socket axial inner portion thereof produces fluid compressive forces acting on the sealing ring to hold it in axial sealing engagement with the axial recess abutment and in radially inward sealing engagement with the spigot outer surface.

Certain embodiments of the present invention are described, reference being had to the accompanying drawings wherein.

Figure 1:
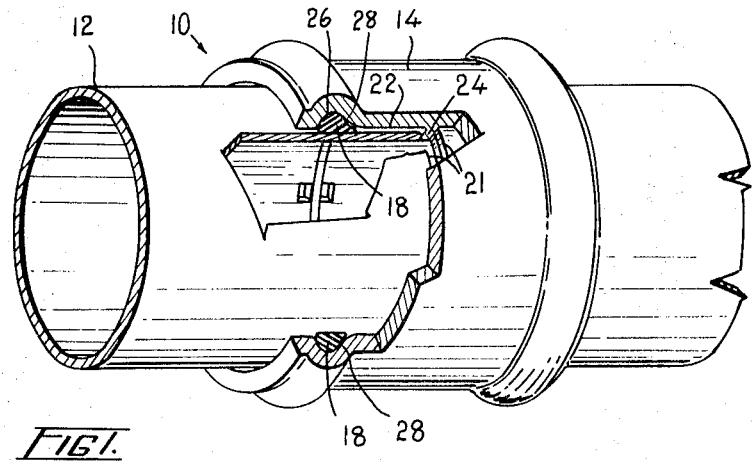
FIG. 1 is a general view in partial section showing a coupling assembly according to the present invention.

Referring to FIG. 1, the assembly 10 comprises a spigot portion 12 entered within a muff or socket 14 containing a sealing ring 18.

Figure 2:
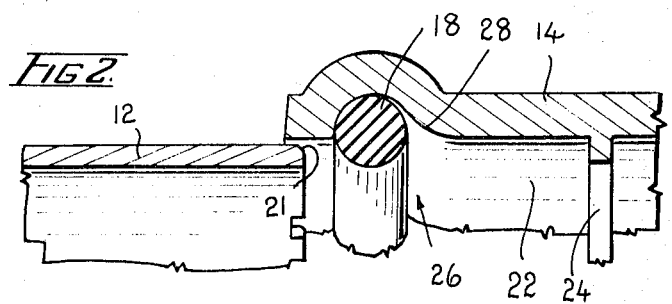
FIG. 2 is a partial diametrical section of the combination in disassembled array.

Referring to FIG. 2 the spigot 12 is provided with a chamfered nose or lead portion 21 to assure controlled penetration of the O-ring 18. The ring 18 is of an elastomeric material having Durometer hardness preferably in the range 40 to 50, with a preference for 45 Durometer. Socket 14, illustrated as being an iron casting is provided with a bore 22 terminating in an annular collar 24.

The socket 14 has an annular ring recess 26 of generally semicircular section, having a relieved or tapered wall portion 28 at the axially inner end thereof, to provide a ring conforming surface.

It has been found that particularly good results are obtained when the profile of the ring recess 26 extends for an arc of about 135° of a circle, having a radius of say one-quarter inch, while the relieved or reverse turn portion 28 is a radius arranged tangentially of the socket bore, having a value approximately double that of the recess 26, such as one-half inch in the particular instance.

Figure 3:
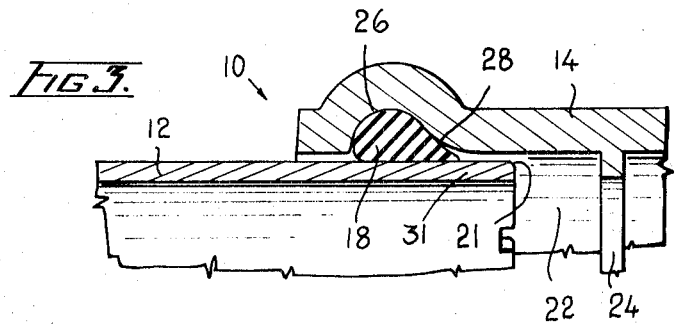
FIG. 3 is a view similar to FIG. 2, in the partially assembled condition.

Referring to FIG. 3, wherein the inner end portion 31 of spigot 12 is entered through the O-ring 18, the axially inner side of the ring 18 is deformed by the surface 28 into a wedge-shape, having an axially elongated radially inner surface 32 contacting the spigot 31 and a sloped taper portion 33 of generally triangular form.

It is contemplated that axial reversal of the direction of groove relief would suit the construction for use under high vacuum. In the presently disclosed form the subject joint is suitable for pressures up to about 250 p.s.i. or vacuum up to 15 inches of mercury.

Figure 4:
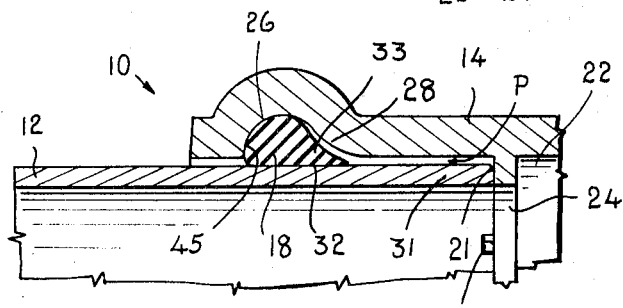
FIG. 4 is a similar view of the assembled combination in operative assembled relation.

In FIG. 4 the assembly is shown in the sealed working condition wherein the application of pressure fluid P at the juncture of collar 24 with the spigot nose displaces the deformed ring 18 axially or plastically into sealing axial engagement with the axially outer portion 45 of the ring recess 26, the relative sizes of ring 18 and recess 26 in relation to the radial clearance provided between spigot 12 and socket bore 22 maintaining the wedge form of the ring 18, so that the sealing force of the ring 18 and the spigot wall is directly proportional to the fluid pressure of the system. The use of a castellated pressure recess 47 in the nose of the spigot 12 is shown.

In a typical installation wherein the difference in diameter between the spigot outer diameter and the socket inner diameter is in the order of 0.020 inch—0.050 inch, use of an O-ring of relatively large cross section and of specified hardness ensures required deformation of the ring section.

The use of large cross section soft O-rings for creep sensitive pipe materials is an advantage. The O-ring may be of synthetic rubberlike material having resistance to permanently set commensurate with the service of the system. Attempts to practice the subject invention, utilizing a sealing O-ring of hardness in excess of 70 Durometer may lead to failure of an inserted thermoplastic pipe, due to creep.

Typical dimensions of thermoplastic pipe suitable for use with the present invention are as follows.

| Nominal diameter, inches | Minimum wall thickness | Maximum wall thickness |
|---|---|---|
| 2 | .060 | .300 |
| 3 | .070 | .350 |
| 4 | .080 | .400 |
| 6 | .100 | .450 |
| 8 | .100 | .500 |
| 10 | .100 | .500 |
| 12 | .100 | .500 |

What I claim is:

1. A pipe joint seal comprising a first pipe having a substantially rigid muff portion at its end, a second pipe having one end telescopically entered in the muff portion of the first pipe, an arcuate annular recess in the inner wall of the muff portion adjacent its open end and located to surround said one end of the second pipe, said recess having a relieved surface adjacent to the inside edge of the recess to provide a pressure access annulus in direct communication with a pressure chamber formed between the inner and outer walls of the muff portion and the second pipe respectively, the relieved surface being a reverse curve generated on a radius greater than the radius of the recess, and a solid, hydraulically compressible, soft elastomeric sealing-ring of circular cross section, said ring when squeezed between the recess walls and the said one end of the second pipe being compressed and deformed to fill said recess with a portion protruding into said pressure chamber said portion forming one wall of the pressure access annulus whereby fluid under pressure acts to squeeze and compress the sealing-ring against the recess surfaces and the outer periphery of the said one end to thereby seal the joint.